(12) United States Patent
Hulten et al.

(10) Patent No.: US 7,660,865 B2
(45) Date of Patent: Feb. 9, 2010

(54) SPAM FILTERING WITH PROBABILISTIC SECURE HASHES

(75) Inventors: Geoffrey J. Hulten, Lynnwood, WA (US); Joshua T. Goodman, Redmond, WA (US); Robert L. Rounthwaite, Fall City, WA (US); Manav Mishra, Kirkland, WA (US); Elissa E. Murphy, Seattle, WA (US); John D. Mehr, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 838 days.

(21) Appl. No.: 10/917,077

(22) Filed: Aug. 12, 2004

(65) Prior Publication Data

US 2006/0036693 A1 Feb. 16, 2006

(51) Int. Cl.
*G06F 15/16* (2006.01)
*H04L 29/06* (2006.01)

(52) U.S. Cl. .................. 709/207; 709/206; 713/151; 713/153

(58) Field of Classification Search ............... 709/207, 709/206; 713/151, 153
See application file for complete search history.

(56) References Cited

U.S. PATENT DOCUMENTS

| | | | |
|---|---|---|---|
| 5,377,354 A | 12/1994 | Scannell et al. | |
| 5,619,648 A | 4/1997 | Canale et al. | |
| 5,638,487 A | 6/1997 | Chigier | |
| 5,704,017 A | 12/1997 | Heckerman et al. | |
| 5,805,801 A | 9/1998 | Holloway et al. | |
| 5,835,087 A | 11/1998 | Herz et al. | |
| 5,884,033 A | 3/1999 | Duvall et al. | |

(Continued)

FOREIGN PATENT DOCUMENTS

EP 413 537 2/1991

(Continued)

OTHER PUBLICATIONS

Federal Trade Commission. "False Claims in Spam", A report by the FTC's division of marketing practices, Apr. 30, 2003, http://www.ftc.gov/reports/spam/030429spamreport.pdf.

(Continued)

*Primary Examiner*—Hassan Phillips
*Assistant Examiner*—Backhean Tiv
(74) *Attorney, Agent, or Firm*—Shook, Hardy & Bacon L.L.P.

(57) ABSTRACT

Disclosed are signature-based systems and methods that facilitate spam detection and prevention at least in part by calculating hash values for an incoming message and then determining a probability that the hash values indicate spam. In particular, the signatures generated for each incoming message can be compared to a database of both spam and good signatures. A count of the number of matches can be divided by a denominator value. The denominator value can be an overall volume of messages sent to the system per signature for example. The denominator value can be discounted to account for different treatments and timing of incoming messages. Furthermore, secure hashes can be generated by combining portions of multiple hashing components. A secure hash can be made from a combination of multiple hashing components or multiple combinations thereof. The signature based system can also be integrated with machine learning systems to optimize spam prevention.

44 Claims, 8 Drawing Sheets

U.S. PATENT DOCUMENTS

| | | | |
|---|---|---|---|
| 5,905,859 A | 5/1999 | Holloway et al. | |
| 6,003,027 A | 12/1999 | Prager | |
| 6,023,723 A | 2/2000 | McCormick et al. | |
| 6,041,324 A | 3/2000 | Earl et al. | |
| 6,047,242 A | 4/2000 | Benson | |
| 6,052,709 A | 4/2000 | Paul | |
| 6,072,942 A * | 6/2000 | Stockwell et al. | 709/206 |
| 6,101,531 A | 8/2000 | Eggleston et al. | |
| 6,112,227 A | 8/2000 | Heiner | |
| 6,122,657 A | 9/2000 | Hoffman, Jr. et al. | |
| 6,161,130 A | 12/2000 | Horvitz et al. | |
| 6,167,434 A | 12/2000 | Pang | |
| 6,192,360 B1 | 2/2001 | Dumais et al. | |
| 6,199,102 B1 | 3/2001 | Cobb | |
| 6,266,692 B1 | 7/2001 | Greenstein | |
| 6,308,273 B1 | 10/2001 | Goertzel et al. | |
| 6,314,421 B1 | 11/2001 | Sharnoff et al. | |
| 6,321,267 B1 | 11/2001 | Donaldson | |
| 6,327,617 B1 | 12/2001 | Fawcett | |
| 6,330,590 B1 | 12/2001 | Cotten | |
| 6,351,740 B1 | 2/2002 | Rabinowitz | |
| 6,370,526 B1 | 4/2002 | Agrawal et al. | |
| 6,393,465 B2 | 5/2002 | Leeds | |
| 6,421,709 B1 | 7/2002 | McCormick et al. | |
| 6,424,997 B1 * | 7/2002 | Buskirk et al. | 709/206 |
| 6,434,600 B2 | 8/2002 | Waite et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,546,416 B1 | 4/2003 | Kirsch | |
| 6,592,627 B1 | 7/2003 | Agrawal et al. | |
| 6,615,242 B1 * | 9/2003 | Riemers | 709/206 |
| 6,633,855 B1 | 10/2003 | Auvenshine | |
| 6,643,686 B1 | 11/2003 | Hall | |
| 6,684,201 B1 | 1/2004 | Brill | |
| 6,691,156 B1 | 2/2004 | Drummond et al. | |
| 6,701,350 B1 | 3/2004 | Mitchell | |
| 6,701,440 B1 | 3/2004 | Kim et al. | |
| 6,728,690 B1 | 4/2004 | Meek et al. | |
| 6,732,149 B1 | 5/2004 | Kephart | |
| 6,732,157 B1 | 5/2004 | Gordon et al. | |
| 6,732,273 B1 | 5/2004 | Byers | |
| 6,742,047 B1 | 5/2004 | Tso | |
| 6,748,422 B2 | 6/2004 | Morin et al. | |
| 6,751,348 B2 | 6/2004 | Buzuloiu et al. | |
| 6,757,830 B1 | 6/2004 | Tarbotton et al. | |
| 6,768,991 B2 | 7/2004 | Hearnden | |
| 6,775,704 B1 | 8/2004 | Watson et al. | |
| 6,779,021 B1 * | 8/2004 | Bates et al. | 709/206 |
| 6,785,820 B1 | 8/2004 | Muttik | |
| 6,842,773 B1 | 1/2005 | Ralston et al. | |
| 6,853,749 B2 | 2/2005 | Watanabe et al. | |
| 6,915,334 B1 | 7/2005 | Hall | |
| 6,920,477 B2 | 7/2005 | Mitzenmacher | |
| 6,928,465 B2 | 8/2005 | Earnest | |
| 6,971,023 B1 | 11/2005 | Makinson et al. | |
| 7,003,555 B1 | 2/2006 | Jungck | |
| 7,032,030 B1 | 4/2006 | Codignotto | |
| 7,051,077 B2 | 5/2006 | Lin | |
| 7,117,358 B2 * | 10/2006 | Bandini et al. | 713/153 |
| 7,146,402 B2 * | 12/2006 | Kucherawy | 709/206 |
| 7,155,243 B2 * | 12/2006 | Baldwin et al. | 455/466 |
| 7,155,484 B2 | 12/2006 | Malik | |
| 7,188,369 B2 | 3/2007 | Ho et al. | |
| 7,219,148 B2 | 5/2007 | Rounthwaite et al. | |
| 7,222,309 B2 | 5/2007 | Chupin et al. | |
| 7,249,162 B2 | 7/2007 | Rounthwaite et al. | |
| 7,263,607 B2 | 8/2007 | Ingerman et al. | |
| 7,293,063 B1 | 11/2007 | Sobel | |
| 7,320,020 B2 * | 1/2008 | Chadwick et al. | 709/206 |
| 7,359,941 B2 | 4/2008 | Doan et al. | |
| 7,366,761 B2 * | 4/2008 | Murray et al. | 709/206 |
| 2001/0046307 A1 | 11/2001 | Wong | |
| 2002/0016956 A1 | 2/2002 | Fawcett | |
| 2002/0059425 A1 | 5/2002 | Belfiore et al. | |
| 2002/0073157 A1 | 6/2002 | Newman et al. | |
| 2002/0091738 A1 | 7/2002 | Rohrabaugh et al. | |
| 2002/0124025 A1 | 9/2002 | Janakiraman et al. | |
| 2002/0129111 A1 | 9/2002 | Cooper | |
| 2002/0147782 A1 | 10/2002 | Dimitrova et al. | |
| 2002/0174185 A1 | 11/2002 | Rawat et al. | |
| 2002/0184315 A1 | 12/2002 | Earnest | |
| 2002/0199095 A1 * | 12/2002 | Bandini et al. | 713/151 |
| 2003/0009495 A1 | 1/2003 | Adjaoute | |
| 2003/0009698 A1 * | 1/2003 | Lindeman et al. | 713/201 |
| 2003/0016872 A1 | 1/2003 | Sun | |
| 2003/0037074 A1 | 2/2003 | Dwork et al. | |
| 2003/0041126 A1 | 2/2003 | Buford et al. | |
| 2003/0088627 A1 | 5/2003 | Rothwell et al. | |
| 2003/0149733 A1 | 8/2003 | Capiel | |
| 2003/0167311 A1 | 9/2003 | Kirsch | |
| 2003/0191969 A1 | 10/2003 | Katsikas | |
| 2003/0200541 A1 | 10/2003 | Cheng et al. | |
| 2003/0204569 A1 | 10/2003 | Andrews et al. | |
| 2003/0229672 A1 | 12/2003 | Kohn | |
| 2004/0003283 A1 | 1/2004 | Goodman et al. | |
| 2004/0015554 A1 | 1/2004 | Wilson | |
| 2004/0019650 A1 | 1/2004 | Auvenshine | |
| 2004/0054887 A1 | 3/2004 | Paulsen et al. | |
| 2004/0073617 A1 * | 4/2004 | Milliken et al. | 709/206 |
| 2004/0093371 A1 | 5/2004 | Burrows et al. | |
| 2004/0139160 A1 | 7/2004 | Wallace et al. | |
| 2004/0139165 A1 | 7/2004 | McMillan et al. | |
| 2004/0148330 A1 | 7/2004 | Alspector et al. | |
| 2004/0177120 A1 * | 9/2004 | Kirsch | 709/206 |
| 2004/0199585 A1 | 10/2004 | Wang | |
| 2004/0199594 A1 * | 10/2004 | Radatti et al. | 709/206 |
| 2004/0210640 A1 * | 10/2004 | Chadwick et al. | 709/207 |
| 2004/0215977 A1 | 10/2004 | Goodman et al. | |
| 2004/0255122 A1 | 12/2004 | Ingerman et al. | |
| 2004/0260776 A1 | 12/2004 | Starbuck et al. | |
| 2005/0015455 A1 * | 1/2005 | Liu | 709/207 |
| 2005/0050150 A1 | 3/2005 | Dinkin | |
| 2005/0060643 A1 | 3/2005 | Glass et al. | |
| 2005/0076084 A1 | 4/2005 | Loughmiller et al. | |
| 2005/0080855 A1 | 4/2005 | Murray | |
| 2005/0080889 A1 | 4/2005 | Malik et al. | |
| 2005/0081059 A1 | 4/2005 | Bandini et al. | |
| 2005/0091321 A1 | 4/2005 | Daniell et al. | |
| 2005/0097170 A1 * | 5/2005 | Zhu et al. | 709/204 |
| 2005/0097174 A1 | 5/2005 | Daniell | |
| 2005/0102366 A1 | 5/2005 | Kirsch | |
| 2005/0114452 A1 * | 5/2005 | Prakash | 709/206 |
| 2005/0120019 A1 | 6/2005 | Rigoutsos et al. | |
| 2005/0132197 A1 * | 6/2005 | Medlar | 713/176 |
| 2005/0159136 A1 | 7/2005 | Rouse et al. | |
| 2005/0160148 A1 | 7/2005 | Yu | |
| 2005/0165895 A1 | 7/2005 | Rajan et al. | |
| 2005/0182735 A1 | 8/2005 | Zager et al. | |
| 2005/0188023 A1 * | 8/2005 | Doan et al. | 709/206 |
| 2005/0204159 A1 * | 9/2005 | Davis et al. | 713/201 |
| 2005/0228899 A1 | 10/2005 | Wendkos et al. | |
| 2005/0278620 A1 * | 12/2005 | Baldwin et al. | 715/513 |
| 2006/0031303 A1 | 2/2006 | Pang | |
| 2006/0031306 A1 * | 2/2006 | Haverkos | 709/206 |
| 2006/0036701 A1 | 2/2006 | Bulfer et al. | |
| 2006/0123083 A1 | 6/2006 | Goutte et al. | |
| 2006/0265498 A1 | 11/2006 | Turgeman et al. | |
| 2006/0282888 A1 * | 12/2006 | Bandini et al. | 726/14 |
| 2007/0101423 A1 | 5/2007 | Oliver et al. | |
| 2007/0130350 A1 | 6/2007 | Alperovitch et al. | |
| 2007/0130351 A1 | 6/2007 | Alperovitch et al. | |

| | | | |
|---|---|---|---|
| 2007/0133034 | A1 | 6/2007 | Jindal et al. |
| 2008/0016174 | A1* | 1/2008 | Schiavone et al. .......... 709/207 |
| 2008/0104186 | A1* | 5/2008 | Wieneke et al. ............. 709/206 |

FOREIGN PATENT DOCUMENTS

| | | |
|---|---|---|
| EP | 720 333 | 7/1996 |
| EP | 1376427 | 3/2003 |
| EP | 1376427 A2 | 1/2004 |
| EP | 1376427 A3 | 1/2004 |
| WO | WO 96/35994 | 11/1996 |
| WO | 9967731 | 12/1999 |
| WO | WO 02/071286 | 9/2002 |
| WO | WO03054764 A1 | 7/2003 |
| WO | WO 2004/059506 | 7/2004 |

OTHER PUBLICATIONS

Hansell. "Internet is losing ground in battle against spam", The New York Times: Technology section, Apr. 22, 2003.
European Search report dated Feb. 23, 2007, mailed Feb. 28, 2007 for European Patent Application Serial No. 05105308, 4 pages.
European Search Report dated Jul. 5, 2006, mailed Jul. 24, 2006 for European Application No. EP 06 01 2631, 3 pages.
European Search Report dated Apr. 6, 2006 and mailed Apr. 6, 2006 for EP 04102242, 3 pages.
Graham. "The Future of SPAM" (2003) Computer Journal, CSI Computer Security Institute, vol. 19, No. 1, 6 pages.
International Search Report dated Jan. 17, 2006, mailed Jan. 31, 2006, for PCT Application Serial No. PCT/US04/05501, 2 Pages.
Written Opinion of the International Preliminary Examining Authority mailed Nov. 30, 2005 for PCT/US03/41526, 5 pages.
U.S. Appl. No. 10/208,150, filed Jul. 29, 2002, Andaker.
U.S. Appl. No. 09/893,941, filed Jun. 28, 2001, Horvitz.
U.S. Appl. No. 10/278,591, filed Oct. 23, 2002, Heckerman.
U.S. Appl. No. 10/180,565, filed Jun. 26, 2002, Goodman.
U.S. Appl. No. 09/497,992, filed Feb. 4, 2000, Maller.
U.S. Appl. No. 10/291,260, filed Nov. 8, 2002, Burrows.
Breiman, Friedman, Olshen, and Stone. "Classification and Regression Trees." Wadsworth & Brooks, Monterey, CA (1984).
Quinlan. "C4.5: Programs for Machine Learning." Morgan Kaufmann, San Francisco, CA (1993).
Hayes, Brian."Spam, Spam, Spam, Lovely Spam." American Scientist Online, Jun. 30, 2003. pp. 1-6. vol. 91.
Partial European Search Report, EP05100847, mailed Jun. 21, 2005, 5 pages.
European Search Report, dated Jun. 9, 2005 mailed Aug. 22, 2005 for European Patent Application Serial No. EP04011978, 12 pages.
Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.
Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.
Graham, P., The Future of Spam, Computer Security Journal, CSI Computer Security Institute, vol. 19, No. 1, Jan. 2003, pp. 1-5.
Graham, P., A Plan for Spam, Online!, Aug. 2002, XP002273602, http://www.paulgraham.com/spam.html, retrieved on Mar. 12, 2004.
European Search Report, EP31087TE900, mailed Nov. 11, 2004.
J Byrne, My Spamblock, Google, Jan. 19, 1997, 2 pages.
D. F. Skoll, How to Make Sure a Human is Sending You Mail, Google, Nov. 17, 1996, 2 pages.
L. M. Bowman, Hotmail Spam Filters Block Outgoing E-Mail, CNET NEWS.COM, Jan. 18, 2001, 3 pages.
Cynthia Dwork, et al., Pricing Via Processing or Combatting Junk Mail, Presented at Crypto '92, 1992, pp. 1-11.
Thorsten Joachims, Text Categorization with Support Vector Machines: Learning with Many Relevant Features, LS-8 Report 23, Nov. 1997, 18 pages.

Daphne Koller, et al., Hierarchically Classifying Documents Using Very Few Words, In ICML-97: Proceedings of the Fourteenth International Conference on Machine Learning, San Francisco, CA, USA, 1997, 9 pages.
Ellen Spertus, Smokey: Automatic Recognition of Hostile Messages, Proceedings of the Conference on Innovative Applications Artificial Intelligence (IAAI), 1997, 8 pages.
Hinrich Schutze, et al., A Comparison of Classifiers and Document Representations for the Routing Problem, Proceedings of the 18th Annual International ACM SIGIR Conference on Research and Development in Information Retrieval, Jul. 9-13, 1995, pp. 229-237.
Yiming Yang, et al., A Comparative Study on Feature Selection in Text Categorization, Carnegie Mellon University, 1995, 9 pages.
Yiming Yang, et al., An Example-Based Mapping Method for Text Categorization and Retrieval, ACM Transactions on Information Systems, Jul. 1994, pp. 252-277, vol. 12-No. 3.
David D. Lewis, et al., A Comparison of Two Learning Algorithms for Text Categorization, Third Annual Symposium on Document Analysis and Information Retrieval, Apr. 11-13, 1994, pp. 81-93.
Mehran Sahami, Learning Limited Dependence Bayesian Classifiers, In KDD-96: Proceedings of the Second International Conference on Knowledge Discovery and Data Mining, 1996, pp. 335-338.
William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.
Makoto Iwayama, et al., Hierarchical Bayesian Clustering for Automatic Text Classification, Natural Language, 1995, pp. 1322-1327.
David D. Lewis, An Evaluation of Phrasal and Clustered Representations on a Text Categorization Task, 15th Annual International SIGIR '92, Denmark 1992, pp. 37-50.
Daphne Koller, et al, Toward Optimal Feature Selection, Machine Learning Proc. of the Thirteenth International Conference, Morgan Kaufmann, 1996, 9 pages.
David Dolan Lewis, Representation and Learning in Information Retrieval, University of Massachusetts, 1992.
Tom Mitchell, Machine Learning, Carnegie Mellon University, Bayesian Learning, Chapter 6, pp. 180-184.
Y. H. Li, et al., Classification of Text Documents, The Computer Journal, vol. 41, No. 8, 1998; pp. 537-546.
Juha Takkinen, et al., CAFE: A Conceptual Model for Managing Information in Electronic Mail, Laboratory for Intelligent Information Systems, Department of Computer and Information Science, Linkoping University, Sweden, Conference on System Sciences, 1998 IEEE.
Jacob Palme, et al., Issues When Designing Filters In Messaging Systems, Computer Communications, 1996, pp. 95-101, Stockholm, Sweden.
Richard B. Segal, et al., SwiftFile: An Intelligent Assistant for Organizing E-Mail, In Proceedings of the Third International Conference on Autonomous Agents, May 1999, 7 pages.
Mehran Sahami, et al., A Bayesian Approach to Filtering Junk E-Mail, AAAI Workshop on Learning for Text Categorization, Jul. 1998, 8 pages, Madison, Wisconsin, USA.
David Madigan, Statistics and The War on Spam, Rutgers Univeristy, pp. 1-13, 2003.
Padraig Cunningham, et al., A Case-Based Approach to Spam Filtering that Can Track Concept Drift, In The ICCBR'03 Workshop on Long-Lived CBR Systems, Jun. 2003, 9 pages, Trondheim, Norway.
Mark Rosen, E-mail Classification in the Haystack Framework, Massachusetts Institute of Technology, Feb. 2003, 103 pages.
D. Turner et al., Payment-based Email 5th International Conference on Software Engineering, Artificial Intelligence, Networking, and Parallel/Distributed Computing, Jun. 2004, 7 pages.
John Wong, Preventing Spams and Relays, Linux Journal, Dec. 1998, 6 pages, vol. 1998 Issue 56es, Specialized Systems Consultants, Inc.
Meng Weng Wong, SPF Overview, Linux Journal, Apr. 2004, 6 pages, vol. 2004 Issue 120, Specialized Systems Consultants, Inc.
Stop, in the Name of Spam, Communications of the ACM, Nov. 1998, pp. 11-14, vol. 41 No. 11.
Eric Allman, Spam, Spam, Spam, Spam, Spam, the FTC, and Spam, Queue, Sep. 2003, pp. 62-69, vol. 1 Issue 6.

Tom Fawcett, "In vivo" Spam Filtering: A Challenge Problem for KDD, SIGKDD Explorations, Dec. 2003, pp. 140-148, vol. 5 Issue 2.

J.D.M. Rennie, ifile: An Application of Machine Learning to E-Mail Filtering, Proceedings of the KDD-2000 Workshop on Text Mining, Sixth ACM SIGKDD International Conference on Knowledge Discovery and Data Mining, 2000. 6 pages.

S. Argamon, et al., Routing documents according to style, In First International Workshop on Innovative Information Systems, 1998, 8 pages.

K. Mock, An Experimental Framework for Email Categorization and Management, Proceedings of the 24th Annual International ACM SIGIR Conference, 2001, pp. 392-393.

Jose Maria Gomez Hidalgo, Evaluating Cost-Sensitive Unsolicited Bulk Email Categorization, SAC 2002, pp. 615-620, Madrid, Spain.

A.Z. Broder, et al. Syntactic Clustering of the Web, SRC Technical Note, Digital Corporation, Jul. 25, 1997, 13 pages.

I. Androutsopoulos,et al., An Experimental Comparison of Naive Bayesian and Keyword-based Anti-spam Filtering with Personal E-mail Messages, Proceedings of the 23rd ACM SIGIR Conference, 2000, pp. 160-167.

P. Pantel, et al., SpamCop: A Spam Classification & Organization Program, In Proc. AAAI-1998 Workshop on Learning for Text Categorization, 1998, 8 pages.

G. Manco, et al., Towards an Adaptive Mail Classifier, In Proc. of Italian Association for Artificial Intelligence Workshop, 2002, 12 pages.

Cormac O'Brien, et al., Spam Filters: Bayes vs. Chi-squared; Letters vs. Words, Proceedings of the 1st international symposium on Information and communication technologies, 2003, pp. 291-296, Dublin, Ireland.

Olle Balter, et al., Bifrost Inbox Organizer: Giving users control over the inbox, NordiCHI Oct. 2, 2002, pp. 111-118, Arhus, Denmark.

Lorrie Faith Cranor, et al., Spam!, Communications of the ACM, 1998, pp. 74-83, vol. 41-No. 8.

P.Y. Simard, et al., Using Character Recognition and Segmentation to Tell Computer from Humans, International Conference on Document Analysis and Recogntion (ICDAR), IEEE Computer Society, 2000, pp. 418-423.

S. Li et al., Secure Human-Computer Identification against Peeping: A Survey, Microsoft Research, 2003, 53 pages.

D.A. Turner et al., Controlling Spam through Lightweight Currency, In Proc. of the Hawaii International Conference on Computer Sciences, Jan. 2004, 9 pages.

Thorsten Joachims, Transductive Inference for Text Classification Using Support Vector Machines, In Proceddings of the 16th International Conference on Machine Learning, 1999, pp. 200-209, San Francisco, CA, USA.

Kevin R. Gee, Using Latent Semantic Indexing to Filter Spam, University of Texas-Arlington, 2003, 5 pages.

Fabrizio Sebastiani, Machine Learning in Automated Text Catergorization, ACM Computing Surveys, 2002, pp. 1-47, vol. 34-Issue 1.

Ion Androutsopoulos, et al., Learning to Filter Spam E-mail: A Comparison of a Naive Bayesian and a Memory-based Approach, 4th PKDD's Workshop on Machine Learning and Textual Information Access, 2000, 13 pages.

"MIME", The Microsoft Computer Dictionary. 5th ed. Redmond, WA; Microsoft Press. May 1, 2002.

Ron White, How Computers Work, 2004, QUE Publishing, pp. 238-239.

Michael S. Mimoso, "Quick Takes: Image Analysis, Filtering Comes to E-mail Security", http://searchsecurity. techtarget.com/originalContent.html (Feb. 5, 2002).

"Clearswift Announces the Most Complete e-Policy-Based Email Content Security Product for Service Providers", http://www.clearswift.com/news/item.aspx?ID=144. (Oct. 12, 2002).

OA dated Oct. 8, 2008 for U.S. Appl. No. 11/743,466, 43 pages.

OA dated Nov. 28, 2008 for U.S. Appl. No. 10/799,455, 53 pages.

OA dated Nov. 6, 2008 for U.S. Appl. No. 10/799,992, 46 pages.

U.S. Appl. No. 10/378,463, filed Mar. 3, 2003 Goodman.

I. Androutsopoulos, et al. An Experimental Comparison of Naive Bayesian and Keyword-based Anti-spam Filtering with Personal E-mail. Proceedings of the 23rd Annual International ACM SIGIR Conference, pp. 160-167, 2000.

A.Z. Broder, et al. Syntactic Clustering of the Web. SRC Technical Note, Digital Corporation, Jul. 25, 1997. 13 pages.

Office Action dated Feb. 20, 2008, for U.S. Appl. No. 10/799,455, 125 pages.

Office Action dated Jul. 17, /2008, for U.S. Appl. No. 10/799,455, 39 pages.

Office Action dated Jun. 15, 2009, for U.S. Appl. No. 10/799,455, 48 pages.

Notice of Allowance and Fee(s) Due mailed Mar. 11, 2009 for U.S. Appl. No. 11/743,466.

Office Action Dated Jan. 3, 2008 for U.S. Appl. No. 11/743,466.

Office Action Dated Jan. 23, 2008 for U.S. Appl. No. 10/799,992.

Advisory Action dated Aug. 13, 2008 for U.S. Appl. No. 10/799,992.

Office Action dated May 15, 2009 for U.S. Appl. No. 10/799,992.

How to Obscure Any URL, How Spammers and Scammers Hide and Confuse, last updated Sunday, Jan. 13, 2002, 10 pages, http://doesn'tmatter@www.pc-help.or/obscure.htm; http://www.pc-help.org/obscure.htm.

Yu et al., "RPECVD Thin Cadium, Cooper and Zinc Sulphide Films," Institute of Inorganic Chemistry, SB RAS, Novosibirsk-90, Russia, J. Phys. IV France 9 (1999), pp. 777-784.

Nonfinal Office Action mailed Sep. 28, 2009, in U.S. Appl. No. 10/799,455, filed Mar. 12, 2004, 30 pp.

\* cited by examiner

SPAM FILTERING WITH PROBABILISTIC SECURE HASHES

TECHNICAL FIELD

This invention is related to systems and methods for identifying both legitimate (e.g., good message) and undesired information (e.g., spam), and more particularly to determining probabilities of hashes (signatures) as well as secure hashes to facilitate classifying messages as good or spain with greater accuracy.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, spam is now or soon will become a major threat to trustworthy computing.

A key technique utilized to thwart spain is employment of filtering systems/methodologies. One common filtering technique is based upon a hashing approaching. Hashing in the email filtering domain refers to the process of screening messages by comparing them to a database of known spam. Any message that matches a message from the database is considered spam and moved to a junk folder or deleted. Hashing requires the database of known spam to be updated frequently by reporting mechanisms such as user complaints (e.g., "this is junk" reporting), honeypots (e.g., accounts set up to attract spam), and related user complaint methods.

Unfortunately, these reporting mechanisms have several flaws. First, messages that are actually good may end up getting reported due to user error, or when large senders do not appropriately debounce their lists: a user subscribes to a bulk mailing from a large sender; their account is deactivated, perhaps because they change ISPs; the original ISP randomly selects the now-deactivated account to use as a honey-pot; and all future correspondence from the large sender to this account ends up in a database of spam. Second, some messages are considered good by some users but spam by others (e.g., opt-in commercial mailings or news letters that some users forget they signed up for and thus report as junk). A related problem is that hashing algorithms are not perfect, and good messages sometimes match to spam in the database simply by accident.

For all of these reasons, hashing systems usually require that an email match some minimum number of messages in the database before considering it spam (e.g., they might require that there be 10 matching messages in the database before they move the message to a junk folder, and 100 before they delete the message). Unfortunately, this method is still error prone, because it cannot distinguish between a spammer who sends 1,000 messages, has a 10% complaint rate (100 messages in the spam database) and a legitimate commercial mailer who sends 100,000 messages and gets a 0.1% complaint rate (100 messages in the spam database).

Furthermore, spammers can use techniques to change almost any aspect of their messages, and even relatively modest changes to a message can cause it to not match any of the spam in the database. For instance, a menu attack constructs a message by randomly choosing words (or phrases or sentences) from a series of lists of words (or phrases or sentences) with equivalent meaning so that each message is unique. Other methods for avoiding hashing algorithms include: miss-spelling words, encoding them with HTML character encodings, inserting garbage into them (e.g., a — or a _), adding random words or sentences (chaff) to the message, breaking words with HTML comments, etc.

As can be seen, many spammers continue to find ways to disguise their identities to avoid and/or bypass spam filters despite the onslaught of such spam filtering techniques.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method that involves combining probabilistic methods with secure hashes to create a hash-based architecture that can detect messages with improved accuracy over common hash systems. The systems and methods facilitate distinguishing between spam and good messages in part employing probabilities and thresholds on probabilities (roughly complaint rates) instead of on raw match counts. As a result, for example, messages can be moved to a junk folder if they match a hash that was complained about 5% of the time and can be deleted if they match a hash that was complained about 10% of the time. This threshold can be set with machine learning or by hand. In addition, the present invention uses hash algorithms that are more robust to spammer tricks: aspects of the message that are most difficult for spammers to change are hashed. This includes the IP address, domain names linked to in the message, whether the message contains an image, etc.

According to an aspect of the present invention, probabilities of hashes or signatures can be determined and/or assigned in part by using sources of good messages and spam messages. For example, when a new message arrives, its hash values can be compared to one or more databases. The database can comprise known good messages as well as known spam messages. The hash values of the message can be looked up in the database and the number of spam messages that match the hash and the number of good messages that match the hash can be ascertained. These numbers can be used to compute the probability that the new message is spam. Additionally, the probability can be compared to a threshold. For instance, if the probability exceeds a threshold, then the new message can be classified as spam.

To calculate the probability, a denominator value is required that will lead to an accurate interpretation of the available data to determine the effective spaminess of the new message. Thus, this aspect of the invention provides that sources of spam messages and/or other information can be included in the denominator value. In particular, the denominator value can be determined in part by the number of times that each hash value or signature was ever sent to the system—via a spam or good message. The standard spam hash match counts can then be divided by the denominator value. The computed value can be described as a complaint rate, for example. By determining the complaint rate in this manner, a more accurate characterization about the spaminess of the new message can be made. A few variables can be factored into the determination of the denominator depending on how messages are treated as they arrive to obtain a more accurate denominator.

Probabilities can also be determined in part by counting the number of messages received from each IP address and using this value as the denominator value, by basing the denominator value on a time factor, and/or by requiring that a hash value be seen in a plurality of spam sources before employing it to identify spam.

According to yet another aspect, secure hashes can be generated based on one or more aspects of a message that are particularly difficult to spoof or obscure. More specifically, a secure hash can be created by making combinations of hashing components. For instance, a plurality of hashing components or portions thereof can be combined to create a single hash function. In addition, multiple combinations can be combined to create a single hash function. Hence, multiple signatures can be calculated per message. Multiple values for each signature are possible as well. For example, if the signature is based on domains the message links to and that message comprises multiple domain links, then this particular message can output multiple signatures—one per domain found in the message.

According to still another aspect of the invention, probabilities assigned to a message's signature(s) can be integrated with a machine learning system. In one approach, the signature(s) for known spam or known good messages can be used as training data for a machine learning system. In another approach, a machine learning based probability and a signature-based probability can be combined or compared in some manner to determine a final probability that the message is spam or good.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
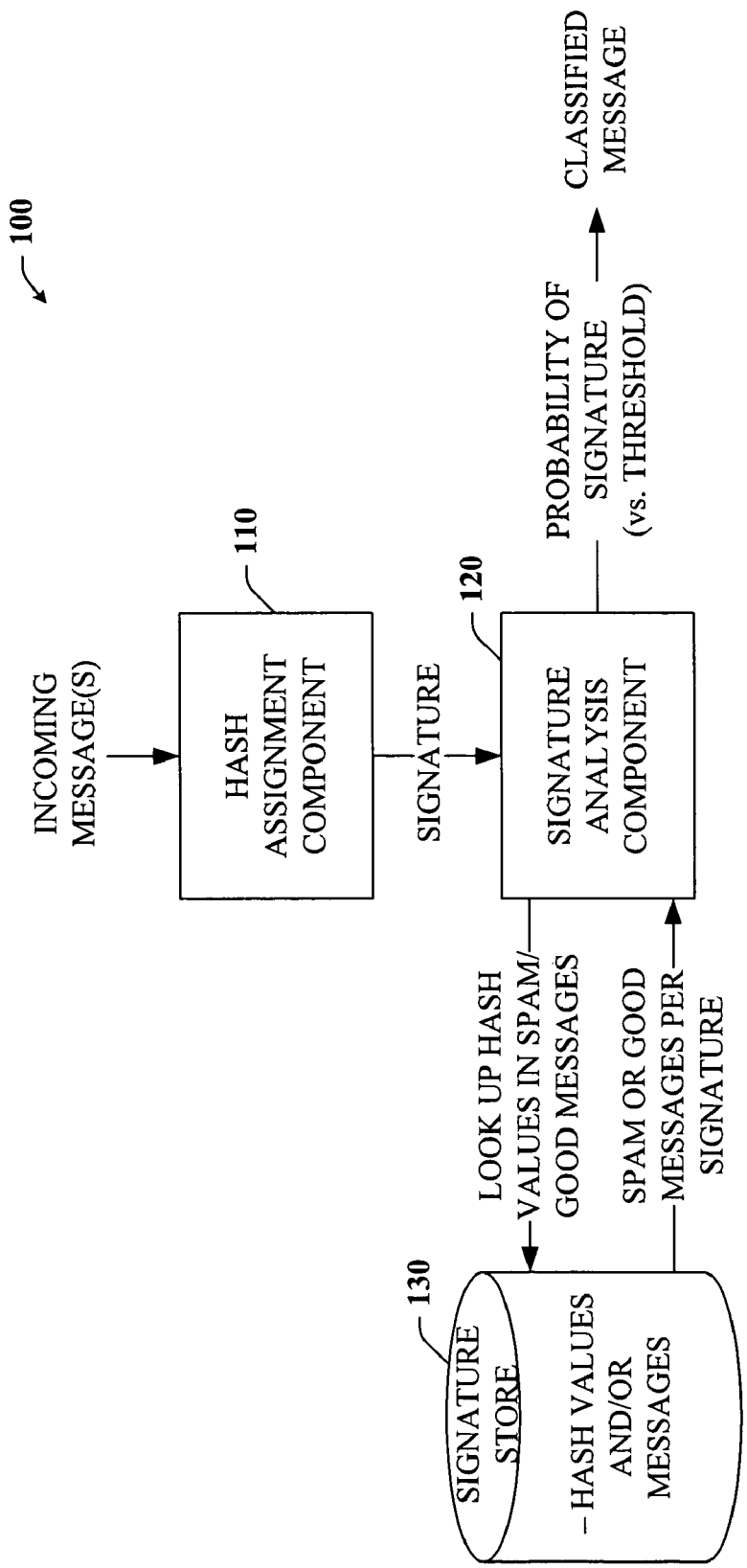
FIG. 1 is a high-level block diagram of a signature-based filtering system that utilizes probabilities calculated based in part on hash values in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with filtering messages and/or generating training data for machine learned spam filtering, for example. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference or conversation between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above. In addition, the term signature as employed herein can indicate a total hash value or individual hash values for an IP address, URL, etc. of a message, for example.

In general, hashing or matching techniques involve looking for a match between known spam and an incoming message. In particular, when a message arrives, each hash function is used to calculate a hash value for the message which yields a set of hash values for the message. These are looked up in a database of known or presumed spam messages (or hash values), and if there are a sufficient number of matches, the message can be flagged as spam. Appropriate action can then be taken. Otherwise, the message is considered to be good and is delivered. When a new spam message arrives via one of the known spam sources, either it (or its hash values) is put into the database of presumed spam messages, perhaps also with a timestamp for when the message arrived.

In common forms of hashing, no learning or relearning is performed. Filters can be simply updated by sending an update of the hash. Additionally, more robust forms of generic hashing algorithms can be too loose or aggressive (e.g., hashing on the first three words of a message)—thus, resulting in higher catch rates as well as higher error rates (e.g., mistaking good messages as spam). To be most effective, however, a spam filter must consider identifying spam messages as well as good messages correctly.

Hashing or match-based techniques largely depend on user feedback, user complaints, or reporting to identify or determine spam messages. However, many senders are mixed (e.g., send both good and spam messages), many users make mistakes, and/or many honey-pots include misspelled addresses or "old" and unreliable data. Thus, a match to a single "this-is-junk" report or message found in a honey-pot cannot be enough to call something spam.

Furthermore, it can be very difficult to know if a hash is too broad or not. Mail from a Bigmail IP address with a link to a HugeHostingService website can be both good and bad; mail from an ISP dialup line with a link to evilspammer.com is all bad. By using probabilistic techniques as described herein, a filtering system can learn that the first hash is ambiguous, while the second is definitive: they hash the same values (IP and domain) and both have some messages marked as spam, but lead to very different probabilities. This is primarily because the system also considers data that can indicate there are some good messages of the first type, and none of the second.

Referring now to FIG. 1, there is illustrated a signature-based filtering system 100 that facilitates probabilistic identification of spam as well as good messages based in part on their respective signatures. The system 100 comprises a signature assignment component 110 that can assign hash values based on one or more hash functions applied to incoming messages. The total set of hash values of a message can be referred to as the message's signature.

The assignment of hashes to an incoming message can depend in part on the contents of the message, the IP address of the message sender, URLs within the message, and the like. Instead of simply classifying an incoming message by its determined hash values or signatures, the message and its signatures can be analyzed by a signature analysis component 120. The signature analysis component can determine a probability that the message is spam or good by examining the message's signatures relative to known good and known spam messages. For example, the message's signatures can be compared to presumed spam and presumed good signatures stored in a signature store 130. It should be appreciated that the signature store 130 can also include the corresponding messages (in addition to their respective signatures and hash values).

Thereafter, the number of spam messages that match the signature and the number of good messages that match the signature can be added together to determine the probability that the signature is spam. A threshold can be employed as well to evaluate the probability of the signature. For example, if the probability exceeds the threshold, then the message can be classified as spam.

In some cases, the number of spam sources or the number of spam messages or good messages may be relatively low and perhaps too few to accurately characterize or make a probabilistic determination of spam. In such cases, a Bayesian prior or smoothing can be employed as well.

Alternatively or in addition, the signature analysis component 120 can make use of available known spam sources (stored in the database 130) along with denominator data. More specifically, the number of times the signature is found in spam as well as the number of times that the signature was ever sent to the system—in either spam or good messages can be determined and used as the denominator. Then, the standard signature match count can be divided by this particular denominator (the total number of times that messages with this signature have been sent). Contrast this technique—which consists of looking at the ratio of spam to all messages, to the earlier suggested technique of looking at the ratio of spam to known good messages. An advantage of this technique is that it does not require having a source of known good messages.

For example, if a message with a particular signature has been sent 1,000 times (denominator) and 20 complaints have been received, then the complaint rate can be determined to be 2%, which relatively very high. However, if messages with this signature have been sent 10,000 times and 20 complaints have been received, then the complaint rate is 0.2%, which is arguably very low.

When determining the appropriate denominator value, messages that are deleted before the user has a chance to complain (or before they have a chance to hit a honey-pot) may not be counted towards the denominator. For instance, consider the following: if the system is deleting 90% of a particular message that comes in 10,000 times, then there are only 1,000 opportunities for someone to complain. Thus, the lower number (1,000) should be used as the denominator, not the higher one. If 20 complaints are received, this is a high ratio (20/1000)—not a low one (20/10,000).

Furthermore, it can also be important to correctly handle mail that is moved to a junk folder when counting denominators. Many users do not have messages at a move threshold set to go to the junk folder; however, many do. If a signature comes in at the move threshold, the chance that it goes to the recipient's inbox is lower. For instance, if half of all users have mail at the move threshold going to the inbox, then we can count such messages as ½ for their contribution to the denominator. Finally, if using honey-pot data as a spam source, then the total denominator (including deleted mail, assuming that we still record that deleted mail went to a honey-pot) can be used.

Another approach to determining the denominator involves counting the number of messages received from each IP address and using this as a surrogate for the full denominator information. In this mode a table with an entry for each IP address that sends messages to the service (or system) can be maintained. This table contains a count of the number of messages from that IP. Additionally, a second table that contains an entry for each IP address that contains a count of the total number of complaints about messages from that IP can be maintained, or source IP information can be maintained along with the hashes and messages in the database in 130.

Meanwhile, as new messages are received and processed for classification, the signature store 130 can be maintained and/or updated. In some settings, newly found spam messages and/or their signatures can be added to the signature store. However, conditions or restrictions can be added to control or regulate which new spam messages are added to the store 130 to mitigate false-positives (incorrectly marking good messages as spam). For example, when a new spam message arrives, the new spam message can be added to the spam database if some minimum fraction of the traffic from the source IP received complaints. Smoothing using Bayesian or other techniques can be employed when there are few counts on which to base probabilistic determinations.

In some cases, hash values may be treated in a discriminative manner. For example, the signature analysis component 120 can require that a particular hash value be present in messages from several different spam sources before it is used to make decisions or spam determinations. This can be accomplished in part by maintaining a table with an entry for each hash value whose value lists the spam sources (e.g., honey-pots and 'this is spam') where that hash value has been observed). When a message arrives, if it matches a signature in the database, the many spam sources it has been observed in can be checked and then the message can be marked as spam if this number satisfies a threshold.

A related mode requires that a hash value be observed in specific combinations of spam sources (e.g., honey-pots and 'this is spam') before it can be used to determine or mark new messages as spam. Alternatively or in addition, when a message matches a signature from the database but is from an IP address that received very few complaints, the message may not be marked as spam.

In another approach to signature analysis, time of receipt, and/or age of the hash values (in the signature store) can be factored into the spam determination. For instance, the component 120 can employ different thresholds for messages that match signatures that are new and messages that match signatures that are old. In practice, imagine someone sends 1,000,000 messages to Bigmail (domain name) with the same signature in a very short time. Next, imagine beginning with a denominator of 1,000,000 and no complaints; then 15 minutes later, perhaps 1% of recipients have read this message, and perhaps 4% of them complained, leading to a 0.04% complaint rate. This sounds like a low complaint rate, but is actually very high, considering the elapsed time. Two weeks later everyone has read the message, meaning a complaint rate of 4%. The same message has a complaint rate that varies by a factor of 100 depending on time. In this approach, a table can be kept that has an entry for each hash value seen whose value is the date and time that the hash was first added to the table. Thus, when a new message arrives and if it matches any signatures, then the analysis component 120 can look up the time those hashes were first seen in this age table; use this time delta as an index into a table of thresholds (e.g., there can be a set of thresholds for messages that are <1 day old, one for messages that are 1-2 days old, etc); and use the selected threshold to determine if the message should be marked as spam or not. When the number of spam sources or the number of spam messages or good messages is relatively low and perhaps too few to accurately characterize or make a probabilistic determination of spam, a Bayesian prior or other smoothing technique can be employed. More sophisticated approaches can record the distribution of arrival times for a given hash value, e.g. how many arrived in each hour.

It should be appreciated that denominator computation and storage can be very expensive. Consider this: in full denominator mode if 20 signatures per message are used, and there are 3 billion messages per day, the system 100 may need to keep track of 60 billion signatures per day. Assuming 6 byte signatures, this is 360 gigabytes per day.

However, a variety of techniques to make this process more efficient can be utilized. Clearly any duplicate hashes can be stored as a single hash and a counter. In a more sophisticated approach, for example, the system 100 can wait until a hash or signature has been seen in a honey-pot or has been reported as junk before hashes/counts for it are counted or maintained. In a second approach, a subset of the counting (e.g., only examine every $10^{th}$ complaint) can be taken. In a third, counts can be aggregated: typically, people open one connection and then send many messages over that connection, each with many recipients. This means all of these counts can be aggregated on one box, before sending them to a central location, and that the number of different hashes on each box will be relatively small.

Figure 2:
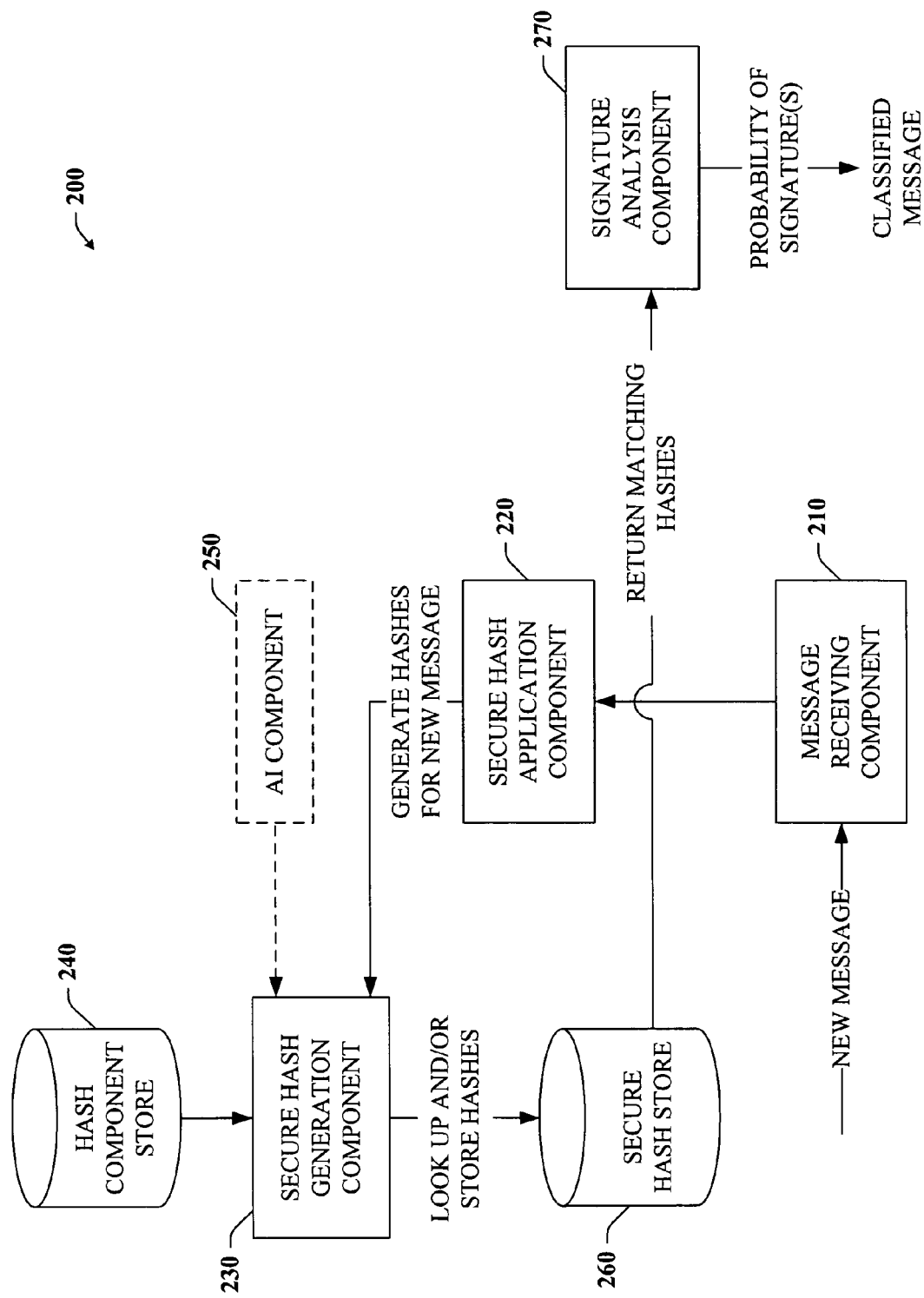
FIG. 2 is a schematic block diagram of a message classification system that employs secure hashes in accordance with an aspect of the present invention.

Referring now to FIG. 2, there is illustrated a block diagram of a secure hash system 200 that facilitates detecting and filtering spam in accordance with an aspect of the present invention. The system 200 comprises a message receiving component 210 that receives new messages and communicates them to a secure hash application component 220. The secure hash application component 220 applies one or more secure hash functions to the new messages. In particular, at least a portion of the new message can be communicated to a secure hash generation component 230. The secure hash generation component 230 can generate one or more hashes for the new message—in part by combining any number of hashing component stored in a hash component store 240. Examples of a few hashing components include an IP address or portion thereof, at least a portion of a URL, spoofing characteristics, "from domain" of the message or a portion thereof, etc. . . .

The secure hash generation component 230 can find those aspects of a message that are most difficult to obscure or modify and can generate hashes based on them. For instance, spammers must send their messages from somewhere (i.e., a specific IP address or range of IP addresses, and it is difficult for them to change or falsify this aspect of their message(s)). Also, since relatively few IP addresses are shared by both good senders and spammers, the chance of a collision leading to a false positive can be relatively small.

Furthermore, multiple secure hashes can be generated and used for each message. For instance, in one aspect, one secure hash can be generated that uses the IP address that the message came from, another can be generated that uses the domains it links to, another can be generated that uses both, and still another that uses words in the subject line. Sometimes there can be multiple values for each of these hashes. For example, if using domains contained in URLs in the message, and there are multiple domains in the message, multiple hashes can be generated—one for each domain. That way, someone sending spam with links to goodsite.com and evilspammer.com gets two hashes: the first one, using goodsite.com, is not very indicative of spam, but the second one, using evilspammer.com, is extremely indicative of spam.

Additionally, multiple hash components can be combined to generate at least one secure hash. For example, one secure hash can make use of: a number of domains in the message; presence of an externally linked image; presence and identity of HTML commands; the first 20 characters of the subject line; and/or the size range of the message. Another secure hash may use the top 24 bits of the IP address and all words in the subject line that are in the 1000 most common words per language. The precise combination of hashing components can be determined using an inference or artificial intelligence (AI) component 250. For instance, the AI component 250 can automatically select combinations of components to optimize the performance of the message or message filtering system. More specifically, in one approach, a combination of hashing components can be initially selected and then other combinations can be added in an incremental manner to determine the best signature using standard AI search techniques. As a result, hashes and their related signatures (e.g., total hash value) generated in the system 200 can be relatively broad or relatively narrow.

The secure hashes generated by the generation component 230 can be looked up and/or stored in a secure hash database 260 with or without their corresponding messages. Following, the secure hash store 260 can return any hashes that match to a message analysis component 270, which can facilitate determining whether the new message is more likely to be spam or good.

Figure 3:
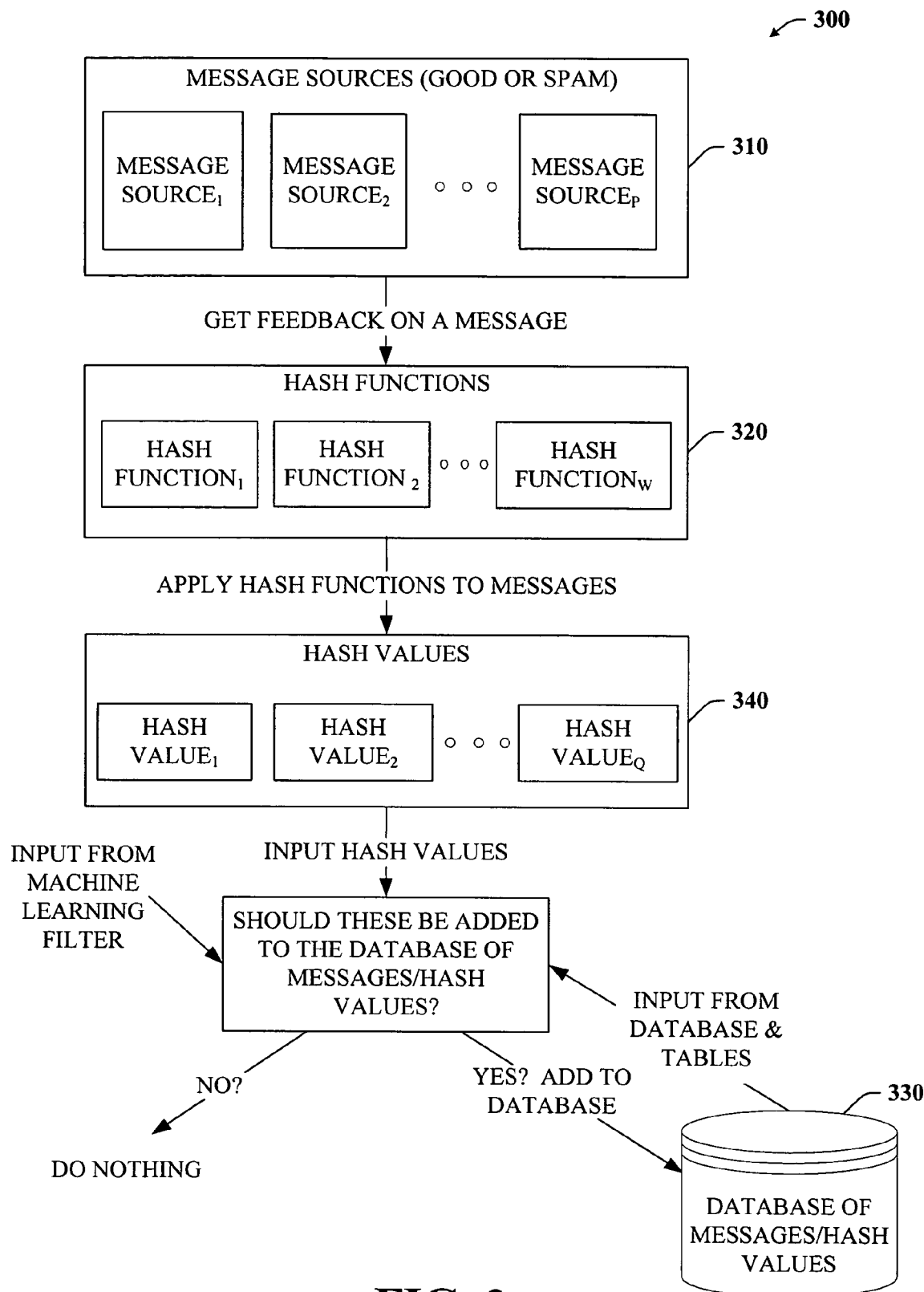
FIG. 3 is a schematic block diagram of an exemplary pathway demonstrating the movement of a message through a message filtration system utilizing probabilistic secure hashing in accordance with an aspect of the present invention.

Referring now to FIG. 3, there is illustrated a schematic block diagram of an exemplary system flow 300 for recording feedback on incoming messages in accordance with an aspect of the message. The system flow 300 can begin with referencing one or more message sources 310 that can include spam and/or good message sources. If any part of the (incoming) messages matches a message from either a good or spam source, that information can be provided via feedback, honey pots, this is junk reporting, etc. From there, one or more hash functions 320 can be applied to the incoming messages to yield computed hash values 340 for the messages.

Depending on the messages or hash values 340 already stored in a database 330, the system can determine whether to keep the recently computed hash values in the database. The determination can be based on evaluating the hash values with respect to a plurality of relevant thresholds. For example, if a computed hash value has ever received a complaint, the value (or a count from it) should be added; or if some sampling process randomly selects the message the value should be added (recall that sampling may be used to reduce the cost of calculating and storing hash values). Otherwise, no further action may be taken. In addition, input from a machine learning filter can be added to the database 330 as well. Such input can include either known spam or good messages, or features therefrom that can be associated with respective hash values which are indicators of presumed spam or presumed good messages.

Figure 4:
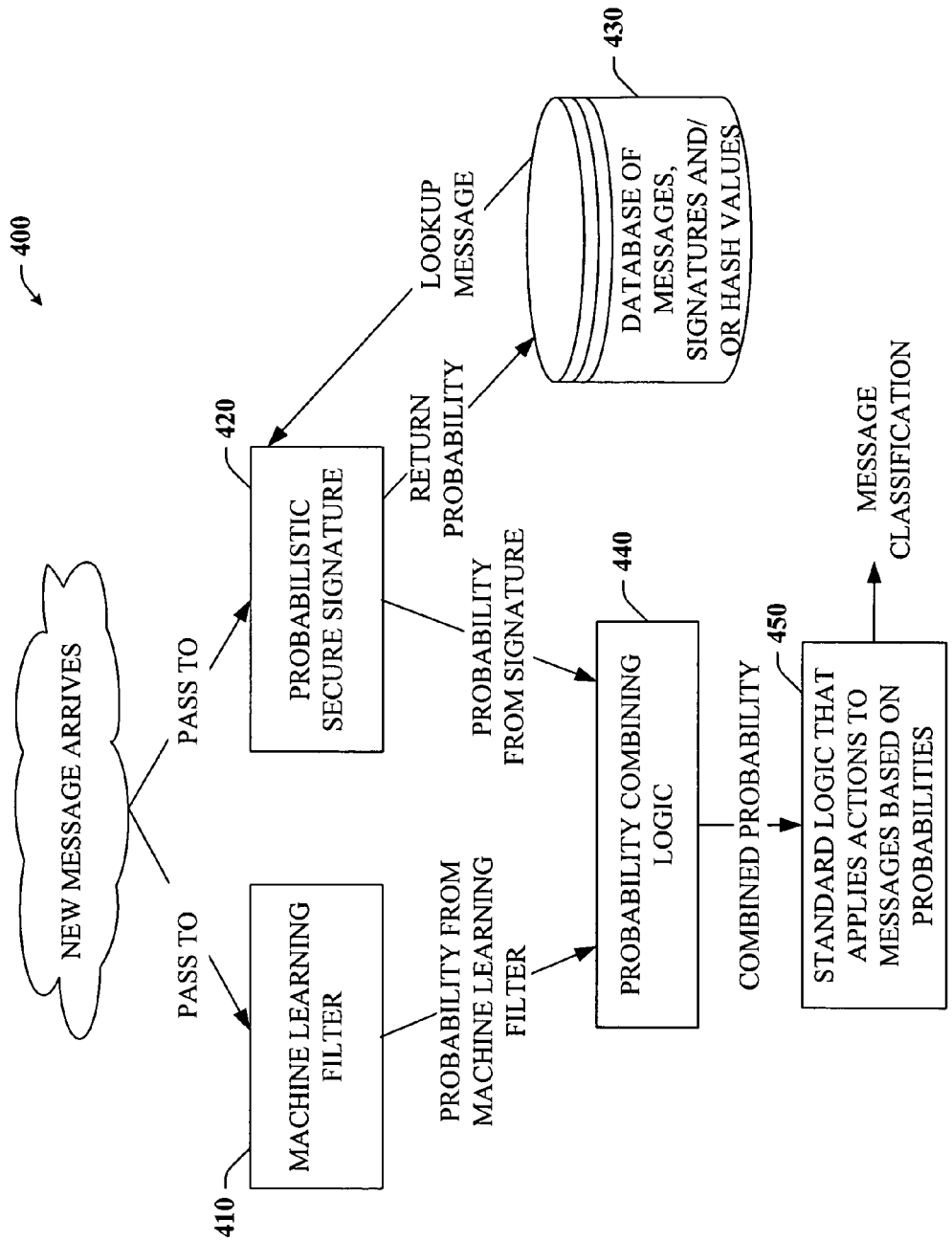
FIG. 4 is a schematic block diagram of a message filtration system employing probabilistic secure hashes in combination with machine learning in accordance with an aspect of the present invention.

Turning now to FIG. 4, there is illustrated a block diagram of a signature-based filtering system 400 that integrates probabilistic secure hashes with machine learning filter systems. The system 400 begins with the arrival of a new message which can then be passed to either a machine learning filter 410 or a probabilistic secure hash sub-system 420, or both. The sub-system 420 can look up the message by accessing a database 430 of hash values/messages/signatures to determine, for example, the number of spam messages that include the message's signature(s) and the number of good messages that include the message's signature(s). By doing so, a probability that the message's signature(s) indicate that the message is spam can be calculated.

Independently of the probabilistic secure hash sub-system 420, the machine learning filter 410 can examine the message in part by extracting one or more features therefrom and assigning weights to the respective features. As a result, a probability that the message is spam can be determined. Both of these probabilities can be combined in some manner by way of a probability combining logic 440. For example, the probabilities can be "combined" by taking the higher of the two probabilities as the probability that the message is spam. Alternatively, the logic 440 can be programmed to only use the signature probability if the machine learning probability meets a minimum threshold such as 0.2 or 0.5. After a "final" probability is determined, a standard logic 450 can be employed to apply the appropriate action to the message based in part on the final probability. Alternatively, the output from 420 can be used as an input feature to the machine learning component in 410.

Another way of integrating probabilistic secure hashes with machine learning filters can involve having one machine learning model and one (very simple) model for each kind of hash. The worst (e.g., highest probability) from any of these can be taken and that probability can be assigned to the message. In this way, as long as each message is caught by any of the signatures or by a machine learning method, it is still marked as spam.

There are several other points where access to information from a machine learning system can improve probabilistic secure hashes. For instance, the system 400 can be programmed to only add a message from the spam source to the database 430 of spam messages if the probability given to the message by the machine learning system 410 satisfies or exceeds a threshold (e.g., 0.2 or 0.5). This means that the signature-based filtering system 400 may not be able to catch spammers who beat the machine learning filter 410 by a huge amount, but it can also greatly lower the chance of thinking that a large volume of good messages are spam, and reduce the computational and storage complexity of the entire system. Furthermore, the signature-based system 400 can employ substantially all signatures and/or hashes as features of the machine learning filter 410. If there is a hash or signature that is 99% spam, and 1% good in the feedback loop, the machine learning filter 410 can learn this. Additionally, the system 400 can use hashes or signatures that match any good message only for machine learning.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 5:
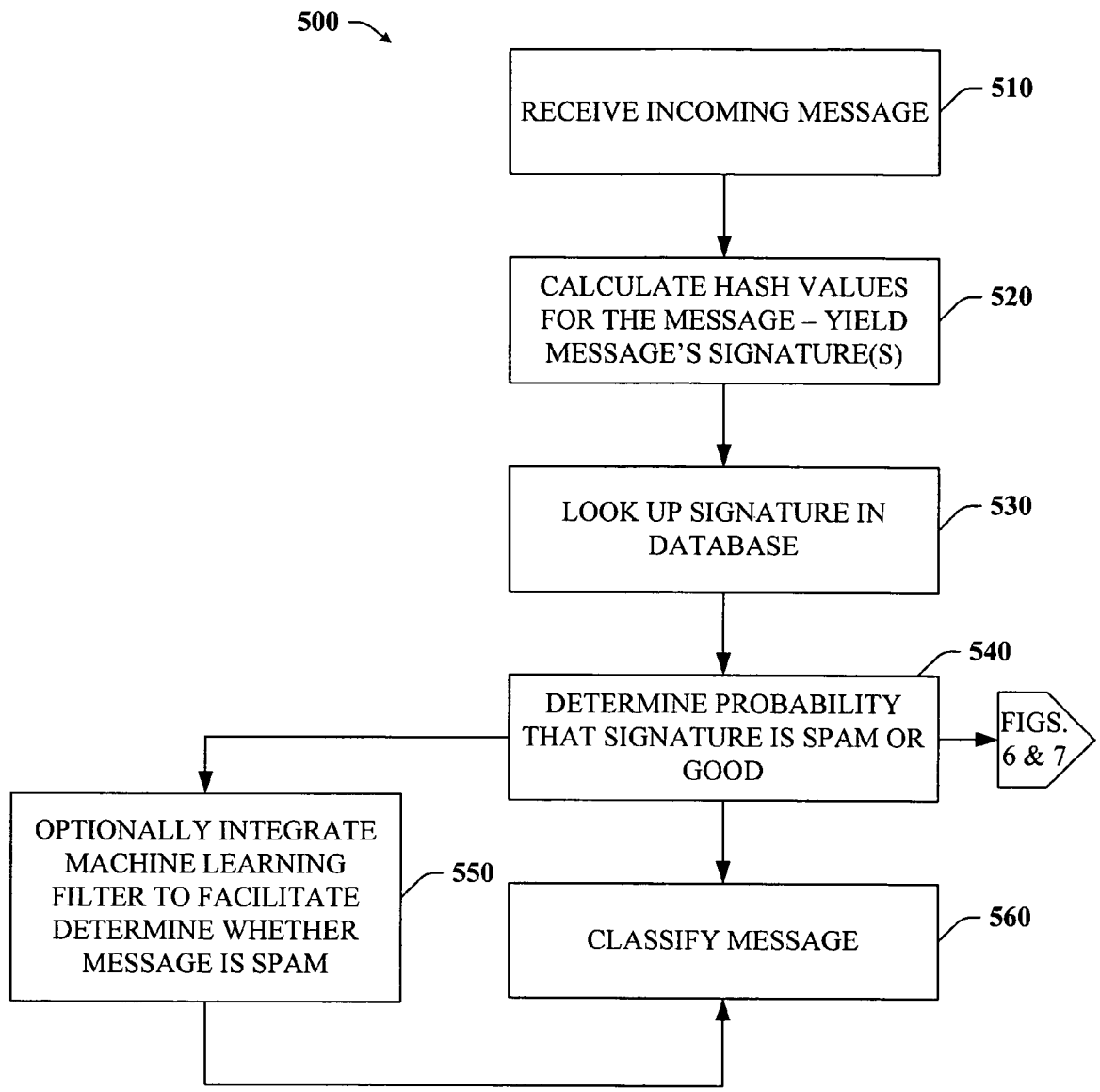
FIG. 5 is a flow diagram of an exemplary method that facilitates filtering messages in part by determining probabilities of hash values assigned to new messages in accordance with an aspect of the present invention.

Referring now to FIG. 5, there is illustrated a flow diagram of an exemplary method 500 that facilitates accurately distinguishing between spam and good messages. The method 500 involves receiving one or more incoming messages at 510. Shortly thereafter, one or more hash algorithms can be employed to calculate one or more hash values for the message at 520. At 530, the message's hash values (signature) can be looked up in a database. The database can comprise hash values and/or the corresponding messages of both presumed good or presumed spam messages. Instead of merely relying on the raw counts of spam or good messages that match the hash values of the incoming message, a probability that the message's hash values indicate spam can be determined at 540. This can be accomplished in part using a plurality of techniques as described in FIGS. 6 and 7, infra.

Once the signature-based probability is computed, it can be combined or integrated with a probability determined via a discriminatively-trained machine learning filter at 550. For example, signatures from the signature-based filtering system can be used as features for a machine learning system. In this example, the signatures can be employed in a manner similar to word features. Additionally, counts and/or the computed probabilities of signatures can be used as inputs in a machine learning system. The verdict (e.g., spam or good) from the signature-based filtering system (or method) can be combined with the verdict provided from the machine learning system by using another machine learning system to ultimately decide whether the incoming message should be marked as spam or good. Similarly, the incoming message can be marked as spam, for example, when the signature-based probability satisfies a threshold set by the machine learning system or falls within a set range of the machine learning probability.

The machine learning system can also be integrated by participating in the building or update of the presumed spam database. For instance, new presumed spam signatures can be added to the database as long as the machine learning system provides some minimum spam score for that message.

Referring again to FIG. 5, the message can be classified as spam or good at 560 and then treated appropriately (e.g., discarded, moved to another folder, etc.). In some instances, anti-spam users may employ machine learning filters as their primary level of spam prevention and protection. In such cases, the signature-based system and method can be invoked as a means to verify the accuracy of the machine learning filter. For example, when a machine learning filter determines that a message is spam, the message's signatures may in fact indicate that the message is likely good. As a result, the message can be "rescued". It should be appreciated that the converse can be utilized as well (e.g., using machine learning filter to "rescue" signature-based spam determination).

Figure 6:
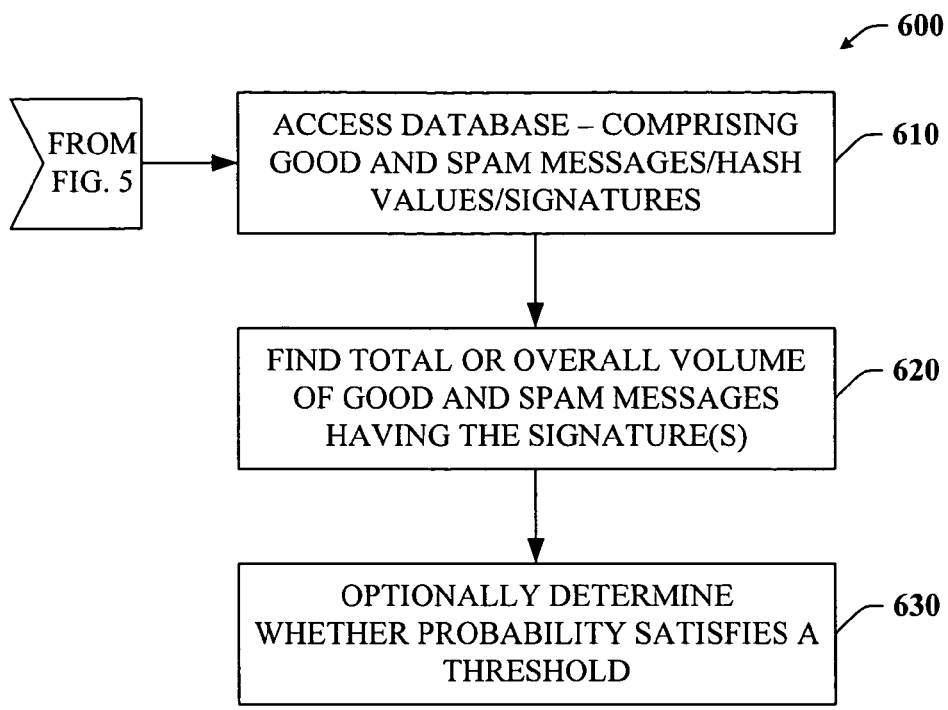
FIG. 6 is a flow diagram of an exemplary method that facilitates determining a denominator value in accordance with an aspect of the present invention.
Figure 7:
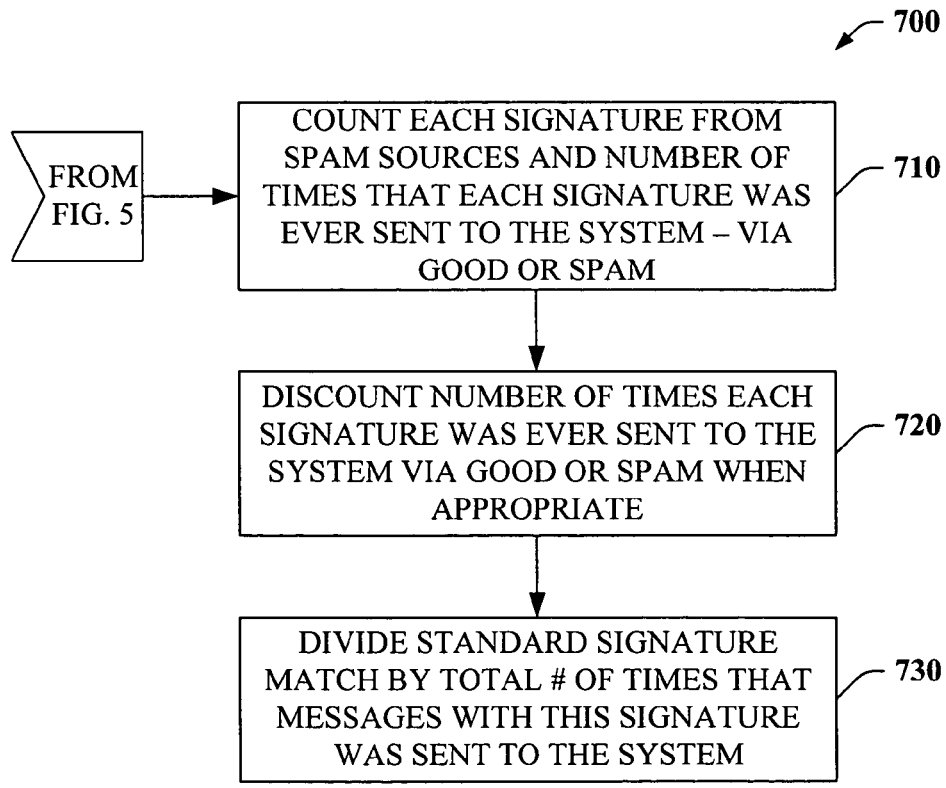
FIG. 7 is a flow diagram of an exemplary method that facilitates determining a denominator value in accordance with an aspect of the present invention.

Turning now to FIGS. 6 and 7, there are illustrated two different exemplary processes 600, 700, respectively, that can be employed to calculate a denominator value—which is used to compute a probability that a signature for a particular message represents spam. In the process 600, the denominator can be determined in part by in following manner: at 610, a database comprising both presumed good and presumed spam messages and/or their respective hash values can be accessed. At 620, a total or overall volume of good and spam messages matching the message's signatures can be calculated to yield the denominator. The message's match count of presumed spam messages can be divided by this denominator number to find the probability that the message is spam. Optionally, at 630, the probability can be compared to a threshold to facilitate classifying the message. For example, if the probability satisfies or exceeds a threshold, the message can be readily marked as spam at 560 (FIG. 5).

In FIG. 7, the process 700 demonstrates exemplary considerations to take into account when calculating the denominator. For example, at 710, a first match count of each signature from spam sources and a second count of the number of times that the message per signature was ever sent to the message system (e.g., overall volume per signature)—via good or spam messages—is noted. At 720 then, the number of times each signature was ever sent to the system can be discounted in a number ways. In one instance, messages that are not made available for user complaint (e.g., marked as junk before user sees it or discarded before user sees it) should be removed from the overall volume of messages received by the system per signature. In another instance, time can be employed to associate validity of data and/or the age of the data. Thus, the first and/or second count can be tracked for a period of time and then discarded if no complaints are received in that time period. In yet another instance, the start of the second count can be delayed until at least one instance of known spam is observed or detected. Moreover, the overall volume of a particular signature being sent to the system can be discounted based in part on several factors. Hence, a subset of the overall volume of presumed and/or presumed spam messages can be used to find the probability that an incoming message is spam.

Figures 8, 9:
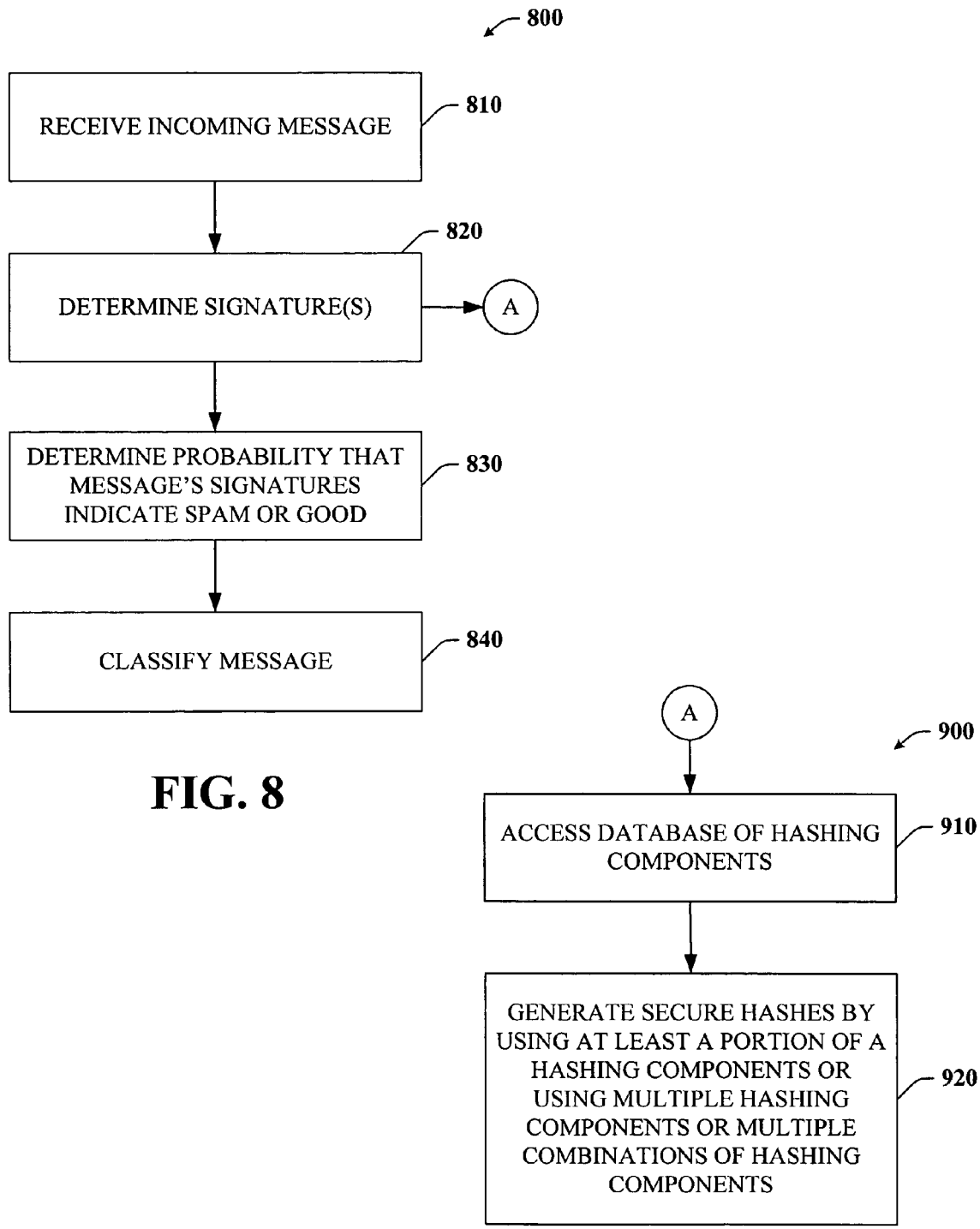
FIG. 8 is a flow diagram of an exemplary method that facilitates employing probabilistic secure hashes to identify spam in accordance with an aspect of the present invention.
FIG. 9 is a flow diagram of an exemplary method that facilitates generating secure hashes (hashes) in accordance with an aspect of the present invention.

Referring now to FIG. 8, there is illustrated a flow diagram of an exemplary process 800 that utilizes probabilistic secure hashes for spam detection in accordance with an aspect of the present invention. The process 800 involves receiving an incoming message at 810 and then computing the secure hash or signature for the particular message at 820. At 830, the probability for the set of secure hashes for the message can be determined. Finally at 840, the message can be classified as spam or good based in part on the computed probability.

In FIG. 9, the process 900 demonstrates generating a plurality of secure hashes to make it more difficult for spammers to avoid or spoof spam filters. The process 900 involves accessing a database comprising of one or more hashing components at 910. At 920, secure hashes can be generated by combining a plurality of hashing components or portions thereof per signature. Furthermore, a secure hash can be generated by multiple combinations of hashing components.

To further illustrate this, imagine that hashing components B, C, D, and F can be used to generate secure hashes. Thus, a first secure hash can be derived from a combination comprising hashing components B and C (multiple hashing components). Following, a second secure hash can be derived from a first combination comprising hashing components B and C and a second combination comprising hashing components F and D.

Examples of hashing components that can be combined or used individually in a single secure hash include at least a portion of a URL, at least a portion of an IP address, a sender's reputation (score), presence of HTML, presence of JAVA script, language of message, presence of at least one image, and presence of at least one attachment.

Though not depicted in the figure, combinations of hashing components to generate the secure hashes can be automatically selected in order to maximize the performance of the anti-spam filtering system. For example, beginning with a combination, subsequent combinations can be incrementally added to determine an optimal secure hash. Moreover, some signatures can be generated to be broader (or looser) or more narrow, depending on user or system preferences.

Figure 10:
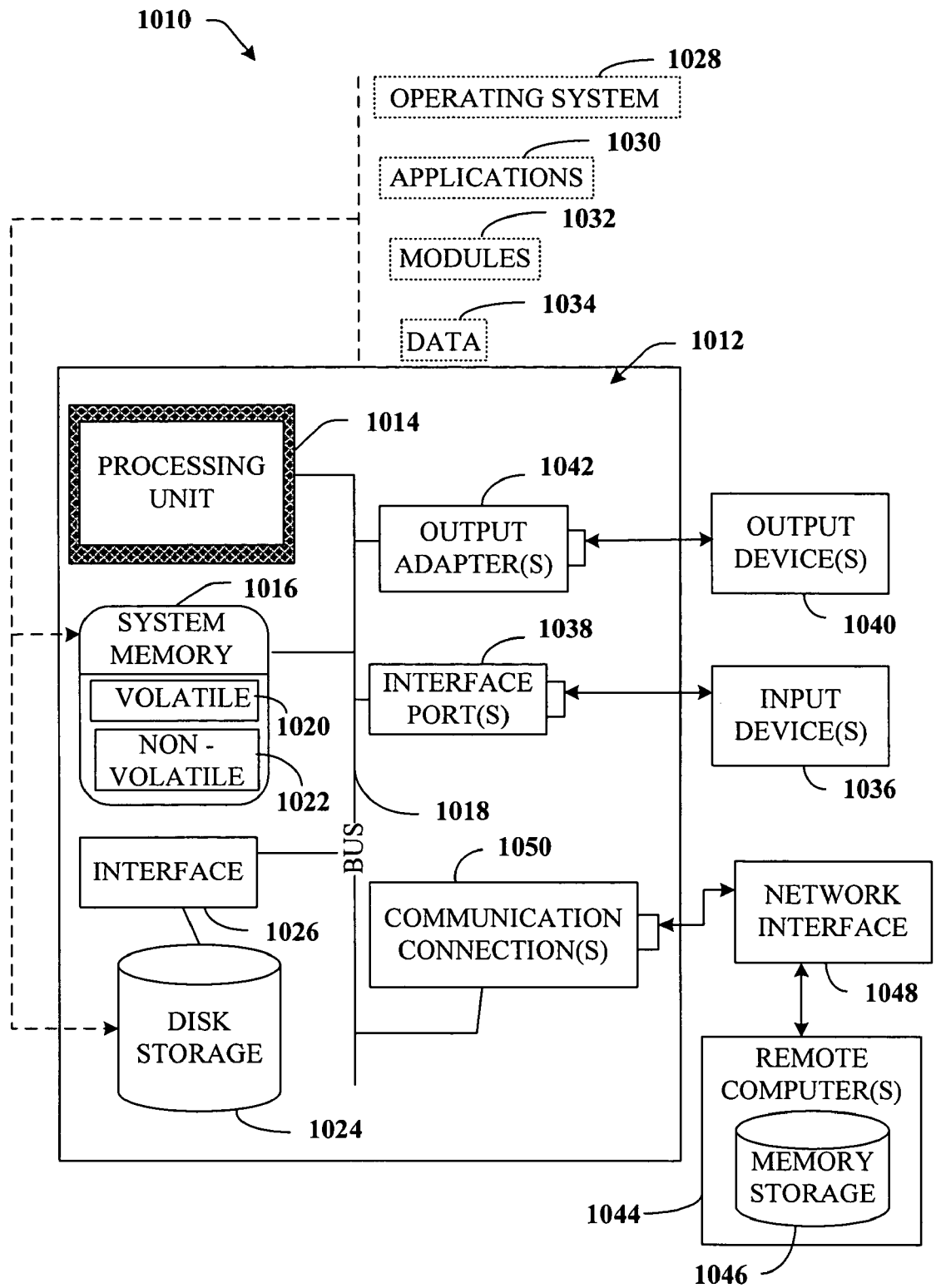
FIG. 10 is a schematic block diagram of an exemplary communication environment in accordance with the present invention.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples the system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044.

Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more program storage mediums readable by at least a computer having at least one memory and at least one processor, the one or more mediums tangibly embodying one or more programs of instructions executable by the at least one computer to implement a signature-based message filtering system that facilitates spam prevention and protection comprising:
   a signature assignment component that determines and assigns one or more signatures for an incoming message based in part on at least one hash function; and
   a signature analysis component that determines a probability that at least a subset of the message's signatures are indicative of spam based in part on a count of presumed spam signatures that match and a count of the overall volume of messages sent to the system per signature,
   wherein the signature analysis component determines a complaint rate by taking a product of a percentage of recipient complaints by a number of read messages and dividing the product by an overall volume of incoming messages, and based upon how old the read messages are.

2. The system of claim 1, wherein the signature analysis component that determines a probability that at least a subset of the message's signatures are indicative of spam based in part on a count of presumed spam signatures that match and a count of presumed good signatures that match.

3. The system of claim 2, further comprising a signature store that is accessible by the signature analyzing component to facilitate determining the probability, the signature store comprising signatures corresponding to the presumed good messages and presumed spam messages.

4. The system of claim 2, the signature analysis component employs good message data to facilitate determining whether the incoming message is spam.

5. The system of claim 2, the signature analysis component employs good message data from polling users participating in a feedback loop filtering system.

6. The system of claim 1, the signatures comprising at least one of a total hash value, source IP address of a message, or URLs contained in a message.

7. The system of claim 1, the signature analysis component discounts the overall values of signatures by at least a portion of incoming messages marked as junk.

8. The system of claim 1, the signature analysis component discounts the overall volume based on timing, age of presumed spam signatures, or a number of messages seen per user.

9. The system of claim 1, the signature analysis component evaluates a number of sources that report messages as junk.

10. The system of claim 9, the number of sources comprising at least two of the following: honeypot, polling, and junk reporting.

11. The system of claim 1, the signature analysis component samples any subset of presumed spam signatures or overall volume per signature to facilitate determining whether the incoming message is spam.

12. The system of claim 1, the overall volume of messages sent to the system per signature is determined at least in part by counting messages received after receiving at least one complaint that any particular message is spam.

13. The system of claim 12, the overall volume of messages sent to the system per signature is tracked for a period of time such that at least one signature is discarded when no complaints for that signature are received in a given time period.

14. The system of claim 1, wherein multiple signatures are assigned or used per incoming message.

15. The system of claim 14, further comprising multiple hashing components used to generate secure hashes such that at least some of the signatures derive from multiple hashing components.

16. The system of claim 15, at least one of the multiple hashing components is used in at least two of the signatures.

17. The system of claim 16, further comprising an artificial intelligence component that automatically selects one or more combinations of hashing components to maximize the performance of an anti-spam system.

18. The system of claim 16, wherein at least a portion of the signatures are any one of broad or narrow.

19. The system of claim 15, at least a portion of the IP address is used in at least one hashing component.

20. The system of claim 15, at least a portion of a URL in the message is used in at least one hashing component.

21. The system of claim 20, the signature assignment component generates multiple signatures for at least a subset of the URLs when multiple URLs are present in the message.

22. The system of claim 15, at least one hashing component includes at least one of: sender's reputation, presence of HTML, presence of JAVA script, language of message, presence of at least one image, and presence of at least one attachment.

23. The system of claim 1 is integrated with a discriminatively trained machine learning system such that output from the signature-based message filtering system is combined with output from the signature-based system.

24. The system of claim 23, signatures that represent good messages are used to rescue messages otherwise marked as spam by the machine learning system.

25. The system of claim 23, wherein at least a portion of at least one of the following: presumed spam signatures, presumed good signatures, and signatures assigned to incoming messages are used as features of the machine learning system.

26. The system of claim 23, wherein counts or probabilities of signatures are used as inputs into the machine learning system.

27. The system of claim 23, wherein verdicts from the signature-based message filtering system and the machine learning system are combined by another machine learning system.

28. The system of claim 23, wherein the message's presumed spam signatures are added to a signature database when the machine learning system provides a minimum spam score for that message.

29. The system of claim 1, wherein the signature analysis component adjusts a complaint threshold in relation to elapsed time in determining the probability of spam.

30. A signature-based method that facilitates filtering messages for spam detection by a computer processor comprising:
   assigning, by the computer processor, one or more signatures to an incoming message based in part upon at least one hash function;

determining a probability that at least a subset of the message's signatures are indicative of spam based in part on a count of presumed spam signatures that match and a count of the overall volume of messages sent to the system per signature; and determining a complaint rate by taking a product of a percentage of recipient complaints by a number of read messages and dividing the product by an overall volume of incoming messages, and based upon how old the read messages are.

31. The method of claim 30, the signatures comprising at least one of a total hash value, stored IP address, or URL of a message.

32. The method of claim 30, further comprising discounting the overall volume of messages sent to the system per signature based in part on at least one of the following:
- excluding at least a portion of incoming messages are marked as junk upon receipt from the overall volume;
- counting messages received only after receiving at least one complaint that any particular message is spam or at least one message in a honeypot; and
- counting a number of messages seen per user within a time period.

33. The method of claim 30, determining the probability that at least a subset of the message's signatures are indicative of spam comprises at least one of the following:
- evaluating number of spam or good message sources;
- analyzing a subset of presumed spam signatures; and
- analyzing a subset of the overall volume of messages received per signature.

34. The method of claim 30, further comprising generating secure hashes in part by combining a plurality of hashing components to make a plurality of combinations and in part by combining a plurality of combinations.

35. The method of claim 34, wherein at least one the hashing component comprises at least a portion of an IP address and at least a portion of a URL.

36. The method of claim 34, further comprising calculating multiple signature values for at least one hashing component per message when multiple instances of the hashing component are found in the message.

37. The method of claim 34, further comprising incrementally adding one or more combinations of hashing components to a first combination to maximize the performance of an anti-spam system.

38. The method of claim 37, integrating the machine learning system comprises performing at least one of the following:
- rescuing messages otherwise marked as spam by considering for good message signatures;
- employing one or more signatures as features into the machine learning system;
- combining verdicts from the signature-based method and the machine learning system via another machine learning system; and
- adding spam signatures associated with an incoming message to a database comprising presumed spam signatures when the machine learning system provides a minimum spam score for that message.

39. The method of claim 30, further comprising integrating a discriminatively trained machine learning system therein to advance spam detection capabilities.

40. The signature-based method of claim 30, wherein determining a probability that at least a subset of the message's signatures are indicative of spam based in part on a count of presumed spam signatures that match and a count of presumed good signatures that match.

41. The signature-based method of claim 30, further comprising adjusting a complaint threshold in relation to elapsed time in determining the probability of spam.

42. One or more program storage mediums readable by at least a computer having at least one memory and at least one processor, the one or more mediums tangibly embodying one or more programs of instructions executable by the at least one computer to implement a signature-based system that facilitates filtering messages for spam detection comprising:
- means for assigning one or more signatures to an incoming message based in part upon at least one hash function; and
- means for determining a probability that at least a subset of the message's signatures are indicative of spam based in part on a match count to presumed spam signatures that match and the overall volume of messages sent to the system per signature, wherein a complaint rate is determined by taking a product of a percentage of recipient complaints by a number of read messages and dividing the product by an overall volume of incoming messages, and based upon how old the read messages are.

43. The system of claim 42, further comprising means for generating secure hashes in part by combining a plurality of hashing components to make a plurality of combinations and in part by combining a plurality of combinations.

44. A computer storage medium having stored thereon a data packet adapted to be transmitted between two or more computer processes facilitating improved detection of spam, the data packet comprising: information which when receiving by a computer processor determines a probability that at least a subset of a message's signatures are indicative of spam based in part on a match count to the overall volume of messages sent to the system per signature, wherein a complaint rate is determined by taking a product of a percentage of recipient complaints by a number of read messages and dividing the product by an overall volume of incoming messages, and based upon how old the read messages are.

* * * * *

UNITED STATES PATENT AND TRADEMARK OFFICE
CERTIFICATE OF CORRECTION

PATENT NO. : 7,660,865 B2  Page 1 of 1
APPLICATION NO. : 10/917077
DATED : February 9, 2010
INVENTOR(S) : Hulten et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Twenty-eighth Day of December, 2010

David J. Kappos
*Director of the United States Patent and Trademark Office*